Figure 1:
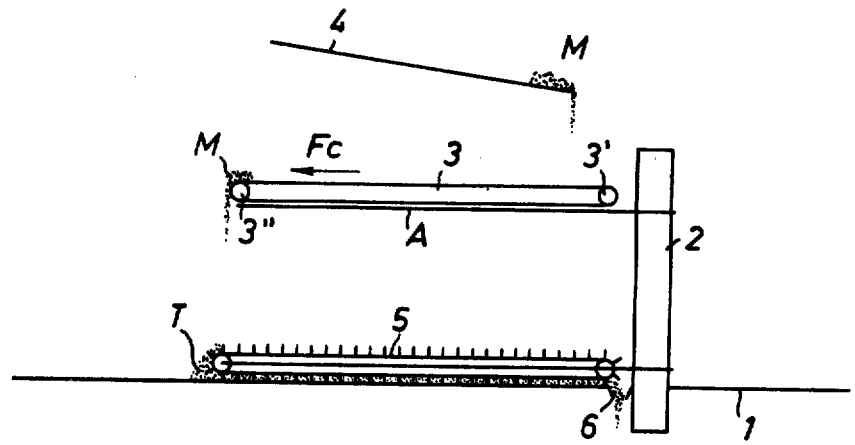

United States Patent [19]
Proner et al.

[11] 3,913,761
[45] Oct. 21, 1975

[54] METHOD AND APPARATUS FOR HOMOGENIZING, STOCKPILING AND SAMPLING PARTICULATE MATERIALS

[75] Inventors: Raymond Louis Proner, Paris; René Léon Clément Bourgoin, Fontainebleau, both of France

[73] Assignee: Societe Anonyme: Ciments LaFarge, Paris, France

[22] Filed: June 18, 1973

[21] Appl. No.: 370,739

[30] Foreign Application Priority Data
June 23, 1972   France ............................. 72.22891

[52] U.S. Cl. ................ 214/152; 198/36; 214/10; 214/16 R
[51] Int. Cl.² ......................................... B65G 65/28
[58] Field of Search...... 214/10, 17 CB, 17 R, 16 R, 214/17 A, 152, 17 D; 198/36, 100, 101, 76, 88, 89, 102

[56] References Cited
UNITED STATES PATENTS
| | | | |
|---|---|---|---|
| 3,233,877 | 2/1966 | Kelly | 214/10 X |
| 3,308,972 | 3/1967 | Jensen | 214/10 |
| 3,509,985 | 5/1970 | Fischer | 214/10 X |
| 3,650,415 | 3/1972 | Krumrey | 214/10 |

FOREIGN PATENTS OR APPLICATIONS
| | | | |
|---|---|---|---|
| 340,767 | 10/1959 | Switzerland | 198/101 |
| 61,249 | 10/1954 | France | 214/10 |

*Primary Examiner*—Frank E. Werner
*Attorney, Agent, or Firm*—Berman, Aisenberg & Platt

[57] ABSTRACT

A method and device for homogenizing, stockpiling and sampling particulate materials. The materials to be processed are received on one or more conveyors mounted by a beam about a vertical axis. The materials are set in uniform continuous rotation about the axis in a given direction of rotation and in radial movement relative to a shaft. The materials are dropped from the ends of the conveyors to the surface around the shaft. The sections of the toroidal mass is constant in area. The materials heaped on the surface are later retrieved by a conveyor cutting radial slices in the toroidal mass. The incoming materials may be divided into two streams each directed to a conveyor, the streams being inversely proportional to the distance from the shaft to the drop point of the respective conveyor. The rotational and radial movements of the conveyor(s) may be controlled in order to obtain any desired distribution of strips over the surface.

19 Claims, 19 Drawing Figures

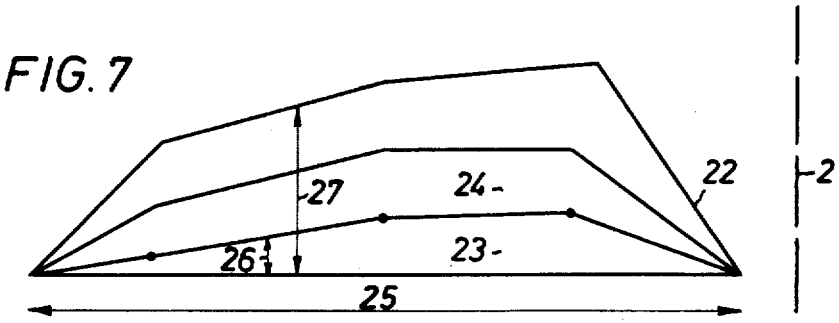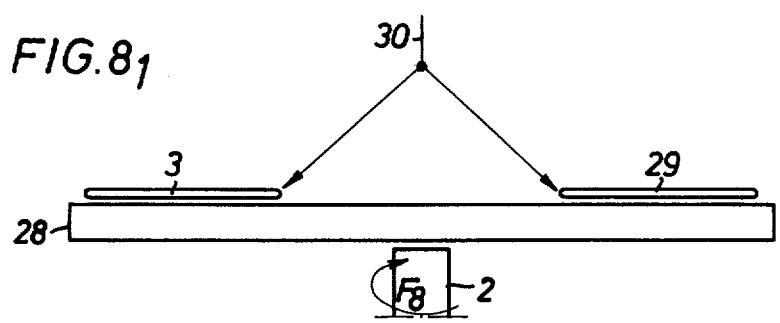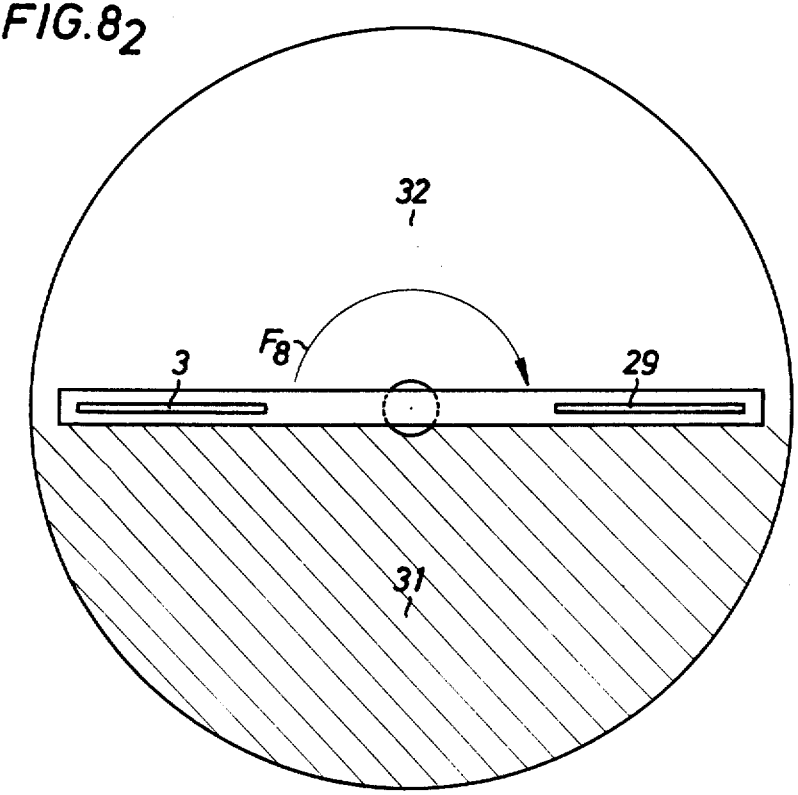

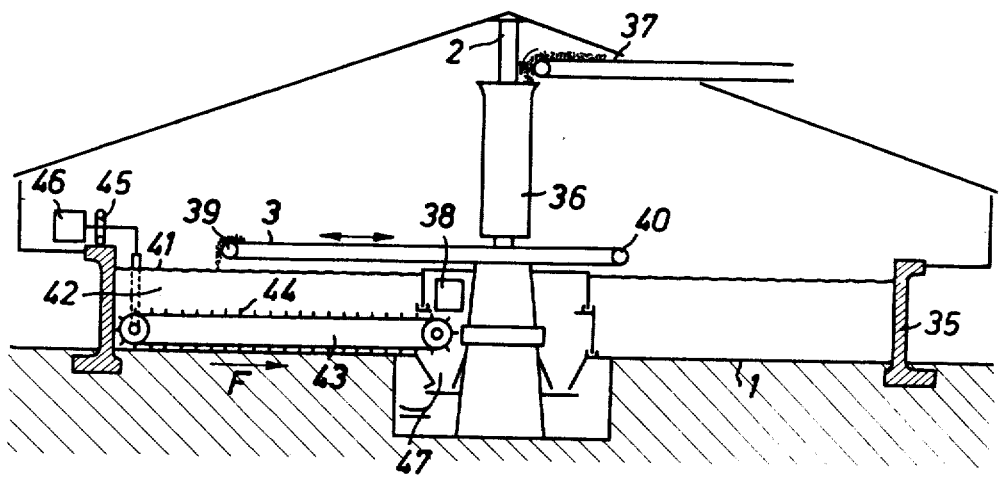
FIG.12₁
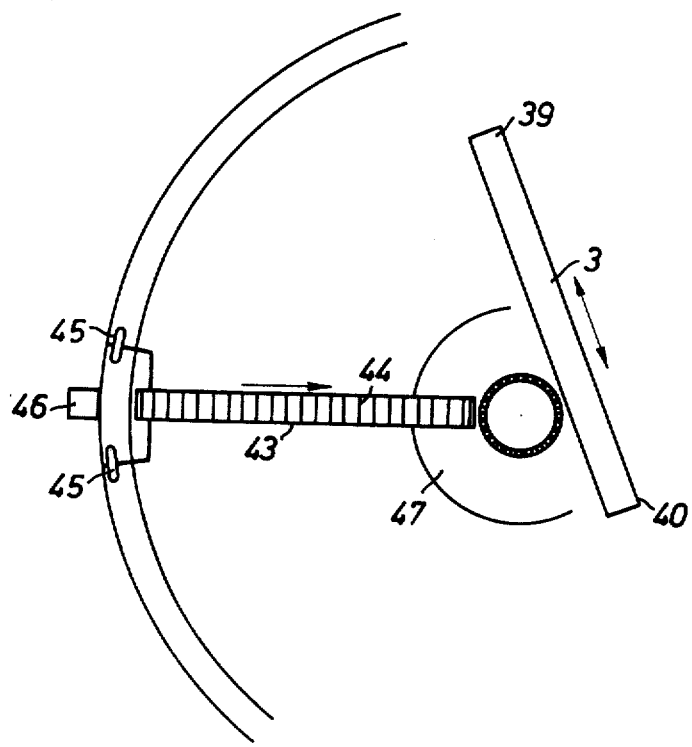
FIG.12₂

FIG.15₁
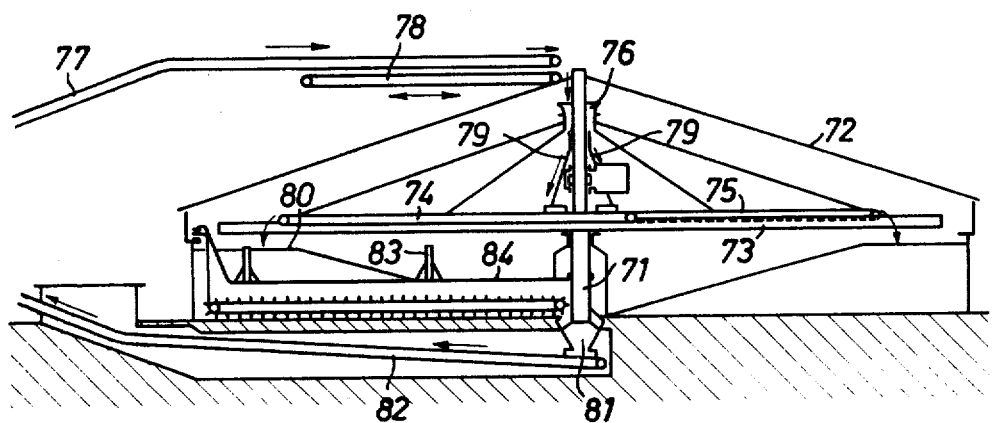
FIG.15₂
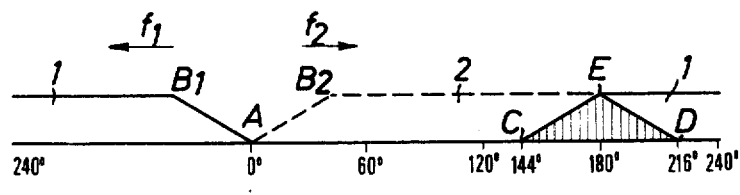

METHOD AND APPARATUS FOR HOMOGENIZING, STOCKPILING AND SAMPLING PARTICULATE MATERIALS

The present invention concerns a method of homogenizing fragmentary and pulverulent materials, starting either with a material of variable and/or random composition, or various materials with a view to obtain a final product having the homogeneity required for particular industrial applications. The invention also relates to apparatus for carrying out the method as well as applications of the method and apparatus. Generally speaking, the invention enables the preparation of material for the purpose of treatment, and possibly after treatment, mixing great masses or stock-piling. It is adapted to pre-homogenization or homogenization of various materials in predetermined amounts, raw materials or intermediaries, used in making cement, in the chemical industry, in the iron and steel industry, or in other industries. An object of the invention is therefore to provide controlled mixtures with a view to subsequent use.

For homogenizing a variable and/or random composition material, or even a mixture of materials, known methods are performed either in two different stages or in a single stage, the first corresponding to successive operations known respectively as pre-homogenization, homogenization or mixture control. The prehomogenization is used in fact to prepare a "homogenizing stockpile" which is provided in particular, when the starting material is considered too heterogeneous in composition for it to be economically transformed directly into a product sufficiently homogeneous to be industrially useful; in such a case it is advantageous to reduce the basic heterogeneity forming an intermediary which will in turn be subjected to the actual homogenization. The homogenization per se consists of more fundamentally organizing the interplay of operations for the formation of a heap or pile with a view to unpiling or retrieving the heaped material so that with each retrieval of material a true sample of all the stockpiled material is obtained.

With a certain known apparatus, by means of relatively complicated and delicate mechanisms, the material is heaped by straight-line reciprocating movement limited to the dimensions of the section of the heap. For each change of direction of the reciprocating movement of the material being dropped, there is produced in succession a stoppage and then an acceleration of the material, mechanical phenomena which produce a formation at a certain point greater than the average section of the heap, therefore requiring the displacement of the turn-around or reversing point. However, since the conical or flat end of the heap only comprises material deposited at the end of "refilling," it is impossible to obtain right from the beginning of the retrieval or unpiling operation material which is a mean representative of the heap sample; consequently there is a disparity between the composition of the sample relative to the mean value of the heap composition up to the point the plane of retrieval reaches all the deposited layers. This disparity or error is large since it may represent 10–20 % of the stockpiled material. This produces a systematic error during subsequent material retrieval which will never attain the mean value of the total mass of material being homogenized to a predetermined composition.

It should be noted here that this systematic error is caused by every retrieval error, whether the retrieval is, or is not, effected, which is the case of remains of a heap which have not been retrieved. On the other hand, the shape or the formation of the heap brings about significant segregation which produces heterogeneity when the retrieval is not simultaneously effectuated over the entire transverse section of the heap. Another disadvantage is that the reciprocating movements of the drop mechanism are necessarily slow which considerably limits the number of constituent layers.

Nevertheless it is very clear that in all industries, in particular cement manufacture, where the end product is sold at low prices and therefore must be of consistent quality for very large quantities, one must be able to obtain the product — cement for example — at the lowest possible cost, which would mean being able to use starting materials of extremely variable composition (and very often very different from the average manufacturing requirements) which are not used, in spite of their proximity to the processing plant, usually because of the absence of appropriate means for homogenizating the materials.

It seems advisable to recall that studies made a long time ago concerning the metallurgical material-mixing operations led to defining the problem of obtaining a homogeneous mixture of two or more different substances existing separately or in the form of unequal or heterogenous mixtures, as follows: the problem is to create from these substances a phase or product in which each particle of one of the substances is as close as possible to a particle of each of the other substances. This problem posed in this way fully corresponds to the definition of a product composed of a line of true samples of the mixture.

U.S. Pat. No. 2,385,494, describes an apparatus intended to resolve this problem and comprises juxtaposed vertical compartments, a loading device in each of the compartments continuously superposing heaps of substances whose ultimate bottom layer is retrieved by a conveyor from the slot formed in the concial lower end of each compartment. The retrieval of material is effected at a constant rate per length unit of each compartment. The rate and distribution of the longitudinal loading and the dimensions of the compartments are selected so that the mixture which forms the bottom layer and falls from the retrieval conveyor has the mean composition of the starting substances. The cost of this device and the delicate controls, difficult to maintain, which it requires for relatively uncertain results explains why it was not developed industrially in spite of its theoretical advantages.

On the other hand, methods and apparatus have also been proposed for the homogenization of mixtures of substances by radial distribution about a center point producing successive juxtaposed layers at an angle equal to the natural slope angle of the heap. These arrangements, however, do not avoid segregation and the material retrieval effected in a direction opposite the slope of the layers does not affect all the layers and is therefore incapable of providing genuine homogenization. One such apparatus provides a continuous heaping and retrieval operation, the heaping being effected by depositing substantially parallel layers along a substantially closed curve by means of arcuate movement between the ends of the heap, the retrieval being effected at the end of the heap of largest section by slices corresponding to the slope of the heap. For the aforesaid reasons, this last method does not resolve the problem of providing true homogenization of mixtures either.

Consequently, the various means proposed up to now do not eliminate the above-mentioned error and therefore do not produce a satisfactory and true homogenization.

Taking into account these inadequate results, the inventors undertook the study of the problem for the purpose of being able to actually eliminate the drawbacks of the conventional methods and assure the obtention of sufficiently homogeneous material so that the manufacturing would be satisfactory while not substantially increasing investment costs. Going back, in particular, to the above-cited definition of homogenization, the inventors got the idea which is at the foundation of the present invention whereby it ought to be possible to obtain a homogeneous mixture and possibly mixture control of the materials concerned in an efficient and relatively simple manner by distributing them with uniform continuous rotation in one direction, preferably at high velocities, in the form of toroidal masses constituted by strips of superposed layers, all the sections formed by a plane passing through the axis of rotation having a constant area, the material retrieval being effected by any appropriate means producing radial slices relative to the toroidal mass. Calculations and tests which were carried out confirmed that this solution furnishes the sought-after results; the resultant product according to the invention statistically answers to the true sampling of the constituent parts in conformity with the definition set forth above.

The angular velocity which produces the heap on an area could be, for example, in the vicinity of one rpm. The angular velocity could be selected as high as necessary, the only limitation being the effect of centrifugal force. It is possible moreover to drop down to very low angular velocities, such as utilized in known reciprocating movements, but in point of fact this might result in the loss of advantages — other than perfect homogeneity — associated with the present method. The most favorable angular velocity is determined in each case as a function of the desired rate of homogenization and the tonnage per hour being processed.

One of the objects of the invention consists in improvements to a method of homogenization, stockpiling or sampling substances wherein the material to be treated is dumped in superposed layers on a surface or area by rotational movement about an axis and by radial movement relative to the axis, said improvement residing in that the rotational movement is continuous and at a high velocity, the path of radial movement is adjustable, the material falling at least at the end of the path of radial movement thereby forming at least one strip, first on the surface, then on the strips resulting from the previoius revolutions so as to eventually form a toroidal mass whose sections determined by a plane passing through the axis of rotation are constant, so that retrieval can therefore be effected by slices defined by two planes passing through the axis of the toroidal mass.

According to preferred aspects of the method:

successive layers are of equal thickness, preferably equal to the maximal dimension of the materials being processed;

the surface may be conical, for example planar;

the retrieval is effected by imparting on slices of material, in the course of continuous rotational movement, a radial movement which may be centripetal or centrifugal so as to remove the material thereby withdrawing the material from the central zone or the periphery.

The adjustment of the retrieval operation is preferably such that the radial movement cuts 5 plies of constant inclination into the superposed layers of material along successive radii at an angle slightly less than the natural angle of the heap slope.

The constant velocity of the material drop point, i.e. the point from which the material drops during the formation of the heap may be its tangential velocity or its angular velocity.

The strips may form, for example, concentric toroidal masses, or spiral masses or other cyclical masses; the strips could, in particular, form toroidal masses on the surface.

In order to form two strips of material, it is possible to divide the incoming material into two parts and impart thereon at two drop points symmetrical about the axis: a tangential velocity and radial velocities in the opposite direction for each of the points, or to divide the conveyed material into two flow streams inversely proportional to the distance from each drop point to the axis, maintaining the distance between the drop points constant and equal to the average diameter of the toroidal masses and establishing at these points constant angular velocities and constant radial velocities in the same direction. In these two cases the toroidal mass (i.e. the strips formed on the surface) are constituted by superposed layers of equal thickness.

According to another embodiment, the drop points may be radially displaced along half the width of the cross section of the toroidal mass so as to constitute the material dropped in the form of two concentric toroidal masses angularly offset by 180°. When two drop points are displaced in opposite directions and symmetrically relative to a diameter in the drop plane, each drop point may be fed with material each half-revolution along the material drop to the rear relative to the direction of rotation.

It should be noted that the method employing two drop points described above may also be carried out in a similar manner with three, four or even more drop points: instead of the two drop points moved along the same diameter, it is simply necessary to provide three, four or N drop points for example displaceable along three, four or N radii at 120° (360/3), 90 (360/4) or 360/N relative to one another.

From the foregoing it results that the invention enables as desired:

1. either multiplying the number of strips deposited in a given period of time by the number of drop points for the same angular velocity and then disregarding the imparted angular velocity limits indicated above, i.e. benefiting from all the advantages of the heap formed by continuous rotation in the same direction at relatively low angular velocities; or 2 depositing heaps over sectors equal to ½, ⅓, ¼ etc. of the circular stockpiling surface. In this case by using heaps of toroidal sectors, a vacant sector between the heaps may be reserved: the method therefore provides an interruption in the distribution or material drop over an angle corresponding to the vacant sector. For this purpose, temporary stockpiling of material corresponding to this vacant sector is provided by a storage belt, for example, during the time it takes for the drop point to pass over the sector which is to remain vacant. In this case the storage belt is driven at a constant speed. In order to continue the strip formation after this interruption, the incoming material is once again directed towards the appropriate drop point; the material previously stored on the storage belt is returned to the bulk of incoming material to which it is added by reversing the direction of movement of the storage belt. The speed of the storage belt is chosen so that the return of the material temporarily stored is spread out over the remainder of the path of movement of the drop point in the sector being loaded. This arrangement avoids lack of uniformity in the distribution of the material in the strips.

The present method also allows the toroidal mass to have a radial section of non-constant height; for this purpose, the various movements are set so as to superpose a certain number of strips as a function of or proportional to the different heights. These various strips could also have a section in proportion to the heights, and the different layers formed would therefore be deposited in a same proportion on the width of the section.

Finally, the radial movements of the drop points for forming the strips or toroidal masses of material on the surface may be centripetal and centrifugal, respectively, in lieu of being centrifugal and centripetal; what counts is that they are in opposite directions.

Straight away one sees that the present method provides a great number of possibilities for constituting the "heap" on the surface thereby providing mixtures answering to practically every situation which might arise.

By taking core samples at random points in the toroidal mass for all these variations of the present method, it has been stated that the mean composition of the heap is practically constant.

In practice the present method could be used for homogenizing and processing, or for stockpiling with a view to the subsequent processing of a mixture issuing from varous substances. The present method could also provide at retrieval a true continuous overall sampling of the mixture.

The invention also consists in an apparatus for carrying out the above method. Such an apparatus for homogenizing a single material or a number of different products comprises a conical surface, planar for example, a vertical central support shaft whose height above the surface may be adjustable, at least one straight-line endless conveyor mounted radially relative to the shaft, means for conveying the material to be homogenized to the end of the conveyor adjacent to the shaft, drive means for rotating the conveyor about the shaft, means for controlling the velocity and direction of rotation of the conveyor as a function of the nature of the material so that in proportion to its supply at the center, the material drops in strips from the conveyor to the surface, means substantially at the surface level for carrying away a certain quantity of material being radially displaceable in the strips of material on the surface, control means for displacing the means for carrying away a quantity of the material along a radius the center of which is at the vertical shaft and in rotation about said shaft, means for controlling the velocity and the path of radial displacement and the angular velocity, means for carrying picking material and discharge means for carrying the mixed material for any desired use.

The feeding of the apparatus is effected, for example, from a hopper into which the substance to be prehomogenized or homogenized is poured, whereby an adjustable spout carries it to the radial endless conveyor. The driving shaft is set in rotation by suitable means, the radial conveyor is advantageously disposed on a revolving beam driven directly by the vertical shaft and carrying the control for the conveyor which may be longitudinally adjustable. Any other revolving means, such as a tipper trolley, revolving spout, or retractable swinging arm may be used for forming the strips or toroidal masses. The means for carrying away the material formed in strips along the surface may comprise an endless conveyor belt provided with scrapers or other projecting portions along a part of its length or worm members; this conveyor belt or the like may be supported freely on the central shaft and at its other end by a motorized trolley driven around the area. The means for carrying away the material — which constitutes retrieval means — may also comprise a shovel, excavator, overshot wheel or equivalent means arranged on the radius rotating about the central shaft.

The surface may be situated in a circular hole or form the horizontal bottom of a pit surrounded by a relative low wall on which the motorized rollers associated with the means for carrying away the material may roll.

Figure 16:
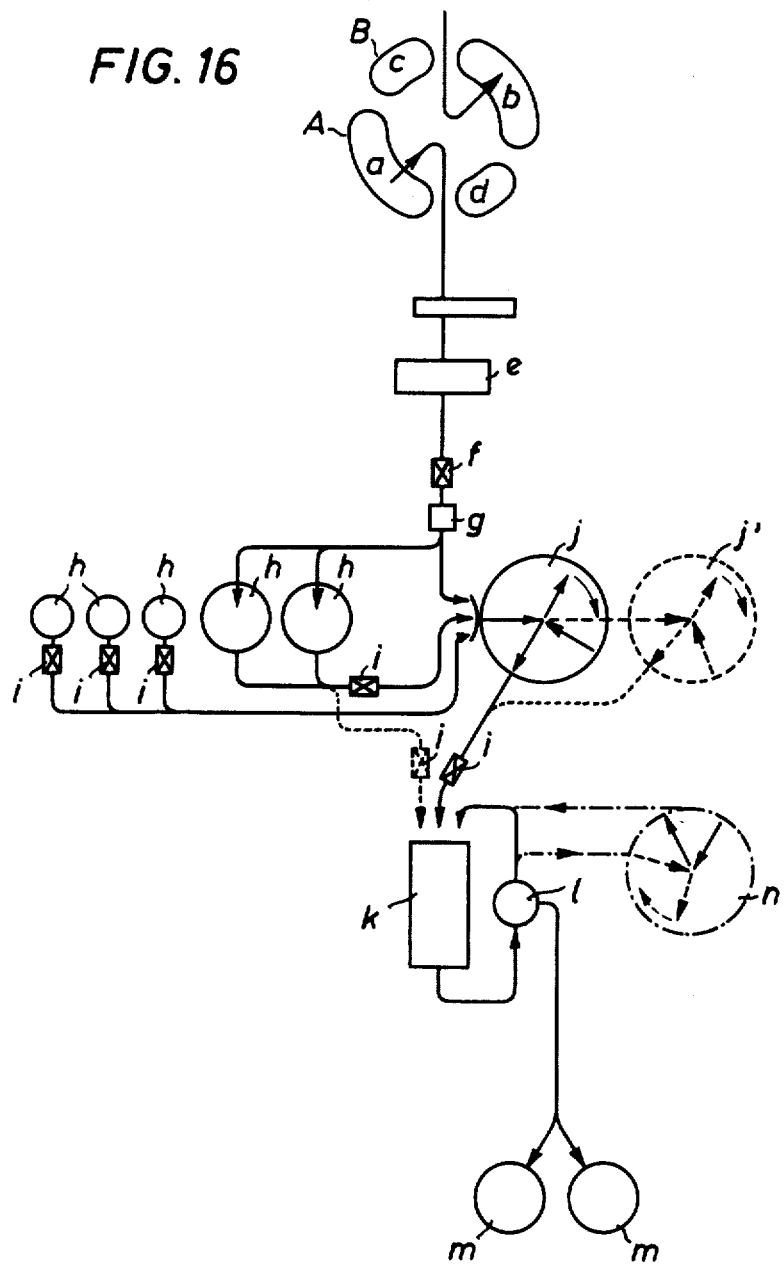

The description of two embodiments of the equipment according to the invention will now be given with reference to the accompanying drawings, in which:

FIG. 1 shows a schematic representation of the operating principle according to the invention;

FIGS. 2–10 schematically illustrate a particular method of producing the toroidal masses or strips and carrying away the homogenized or prehomogenized material;

FIGS. 11–14 schematically show various alternative embodiments;

FIG. 15 is a graphic illustration of the utilization of the intermediary storage means for the material being processed; and FIG. 16 is a homogenizing plant flow sheet carrying out the method and utilizing the apparatus according to the invention;

The schematic representation of FIG. 1 shows a flat stockpiling surface or area 1, a shaft 2 mounted perpendicular thereto supporting a beam carrying an endless conveyor 3 mounted for rotation about the shaft 2; a motor (not illustrated) provides for the straight line displacement of the conveyor (arrow Fc) from the shaft 2 towards the periphery of the area 1. Feeding means 4 is mounted so that the material M to be processed is received at the end 3' of the conveyor 3 adjacent to the shaft 2. From the outer drop end 3" of the conveyor 3, the material falls to the area 1 forming a toroidal mass thereon owing to the rotation of the conveyor about the shaft 2. At level of the area 1, a device 5 is arranged for rotation about the shaft 2 in the same direction but at an angular velocity different than that of the angular velocity of the conveyor 3. The device 5 is adapted to carry back the material of the toroidal mass to a central outlet 6; for this purpose, it may be provided with upstanding cleats, buckets or other means for retrieving the material.

FIGS. 2–10 illustrate various ways of forming the toroidal mass or strips on the area.

Figure 2:
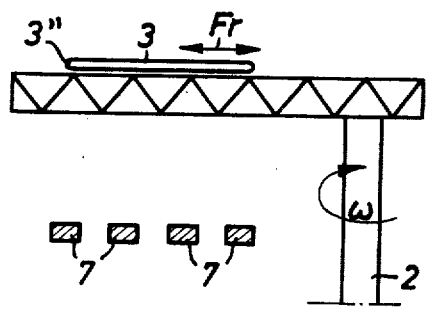

In FIG. 2, the drop end 3" is the end of a radially displaceable conveyor 3 rotatable at a variable angular velocity inversely proportional to the distance between the center (axis of the shaft) and the drop end 3" as the drop end is displaced from the periphery towards the center and vice versa. The radial displacement Fr is therefore uniform. The sections of the strips or toroidal masses formed are constant. A heap can be formed of the same material by two strips coming from two drop ends (FIG. 3) symmetrically arranged relative to the center and displaceable in opposite directions. Each drop end thereby receives half of the flow. The construction is the same as when there is a single drop end, but in the case of FIG. 3, the length of the revolving arm is equal to the outer diameter of the torus.

Figure 3:
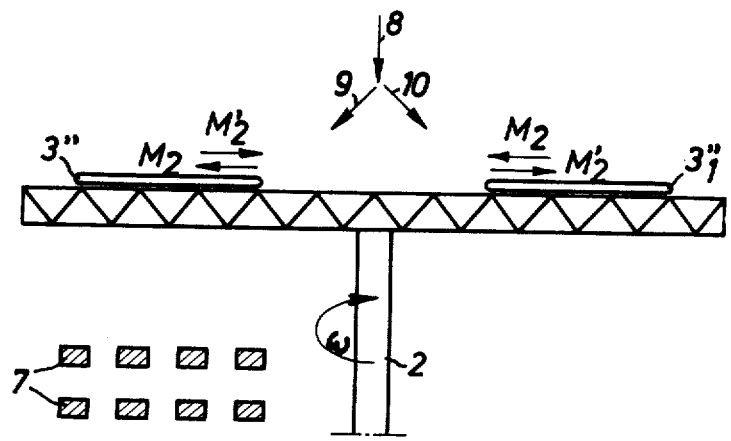

In the arrangement of FIG. 3, the two drop points 3" and 3"$_1$ are displaceable in opposite directions relatively to the center of rotation (shaft 2) from the center to the periphery and vice versa; they are always symmetrical about the center. Their radial velocity $M_2$ or $M'_2$ is uniform, but their angular velocity is variable as a function inversely proportional to the distance of the respective drop point to the shaft or center. Superposed strips 7 of constant section are obtained. The total feed or flow (vector 8) is divided into two parts (arrows 9 and 10) for each of the drop ends, respectively.

It is not practical to give the drop points variable angular velocities; for that reason the total flow rate of the feed is divided into two parts inversely proportional to the distance between the center and the drop points. The displacement of the drop points is therefore effected at constant angular velocities, along the same diameter in the same direction of uniform movement, the velocities being equal. One drop point is displaced between the inner periphery and the circular center line of the torus, while the other drop point is displaced from the outer periphery to the circular center line of the torus. The direction of movement of the two drop points reverses at the circular center line.

Two tori (partial masses) are thereby obtained delimited by the circular center line and lying against each other forming a single heap. The two partial masses have the same composition, and their average characteristics are identical. The distribution of the material inside the two masses is subjected to a 180° planar slight which permits an offsetting of the strips when they are retrieved along a given same radius of the torus.

A beam 11 (FIG. 4) rotatable in the direction (F2) at a constant angular velocity supports two displaceable conveyors 12 and 13 with drop points 12' and 13'. The drop point 12' is displaced between the outer periphery of the torus 14 and its circular center line 15 while the other drop point 13' is displaced between the inner periphery 16 and the circular center line of the torus.

The two drop points are displaced radially in unison in the same direction at a uniform linear velocity. The direction of displacement is reversed at the circular center line 15. Each drop point 12', 13', therefore forms its own heap 17,18. In a plan view the two heaps 17 and 18 are 180° out of phase as are their associated drop points 12' and 13'.

The total flow rate 8 of the material being fed is divided by the divider 19 into two parts 19' and 19" inversely proportional to the distance of the drop points 12' and 13' from the center. The part 19' of the feed supplies the drop point 12' and the part 19" of the feed supplies the drop point 13'. The divider is controlled directly by the translator displacement of the conveyors by any suitable means.

Figure 4:
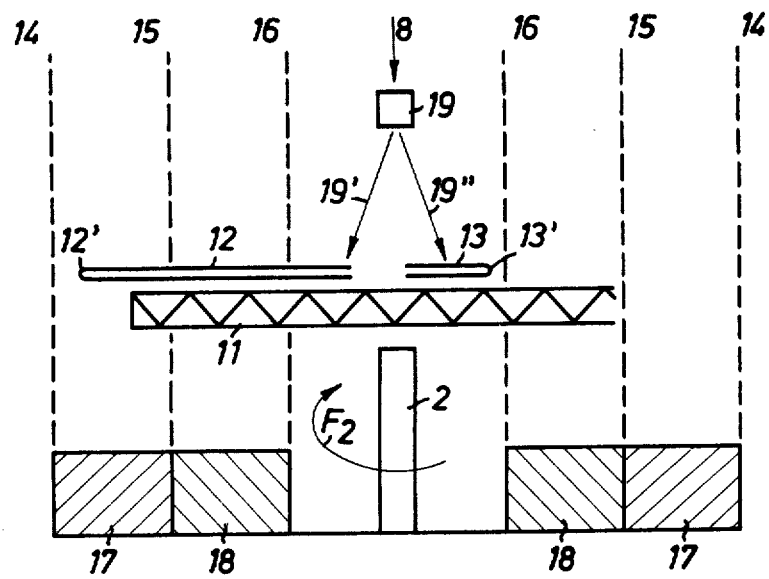

The three arrangements of FIGS. 2–4 produce strips of constant section which form at the interior of the heap layers of equal thickness, favoring excellent homogenization.

Figure 5:
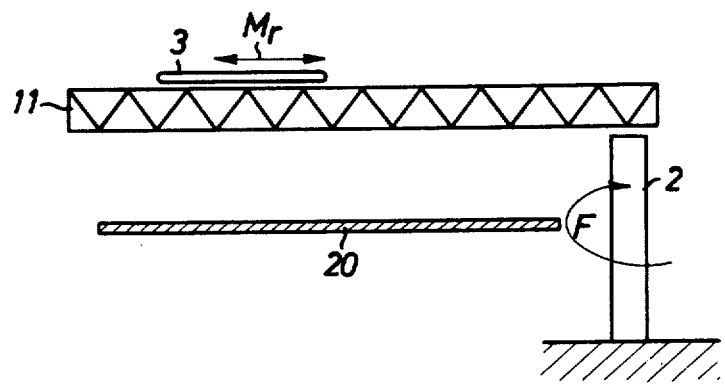

Layers of equal thickness may also be obtained with one drop point driven at constant angular velocity wherein the radial velocity of this drop point is inversely proportional to its distance from the center. This arrangement is illustrated in FIG. 5; a beam 11 rotating at a constant angular velocity supports a conveyor 3 radially displaceable for straight-line movement Mr variable according to the function=R/R', R and R' being the outer and inner radii; the layers 20 obtained on the area are of uniform thickness.

Two drop points each receiving half of the feed and displaceable in opposite directions may be equipped and operate in the manner indicated above.

Figure 6:
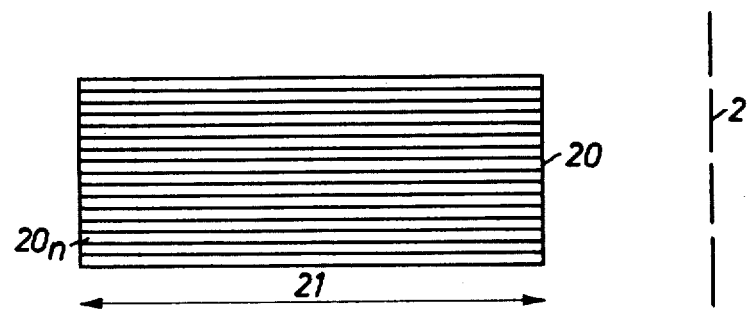
Figure 9:
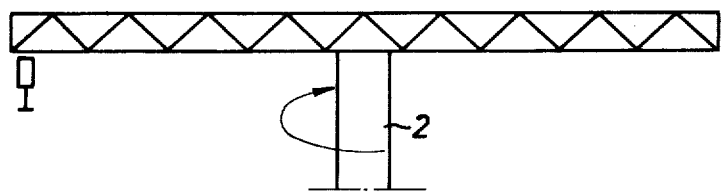

FIG. 6 shows the rectangular cross section 20 of a torus about the shaft 2. The successive layers are of constant thickness across the radial dimension 21 of the torus.

FIG. 7 shows a more general case of a section 22 of a torus about the shaft 2. The successive layers 23 and 24 all extend across the entire radial dimension 25 of the toroidal mass. The height 26 of each point is proportional to the total height 27 of the heap at that point (FIG. 7). These figures correspond to the alternative embodiments and considerations hereinbelow.

When the section of the toroidal mass does not have a constant height, it may be heaped with strips of constant section according to one of the methods described above, but by superposing a number of strips proportional to the height at each point. For this purpose, the radial translatory movement of the drop point(s) is stopped at the points where the desired height is greater. The stoppage or dead time of the drop point(s) is proportional to the height of this slice, for each vertical slice of the cross section of the torus.

In order to obtain the same result in the aforesaid case where the radial displacement of the drop point(s) is a function of a R/R', a correction of this displacement as a function of the height is necessary according to the following function:

$$a\ R/R' \times H/H'$$

It should be noted that whether the height is or is not, constant:

1. the formation of the strip is continuous and never stopped since it is produced by the tangential velocity of the drop end which is not interrupted or reversed;
2. successive layers are present in equal proportion along the entire width of the cross section of the heap regardless of the shape of this section.

In the case of FIG. 8 (FIG. 8$_1$ in elevation and FIG. 8$_2$ in plane), the beam 28 supports two conveyors 3 and 29. The rotation is in the direction $F_R$. Each conveyor is fed only during a half-revolution of the beam by means of a flap 30, the half-revolution always being the same. In the plan view, the conveyor 3 begins dropping material while the material drop from the conveyor 29 is stopped. Only half a toroidal mass 31 is then formed, the other half 32 of the surface, not being fed, therefore provides material to be carried away.

This embodiment corresponds to a variant of the method according to which, in lieu of a complete 360° torus, a 180° part-torus is formed while preserving the character of the continuous strips of a same direction:

It is seen from the drawing that this result is obtained by two material drops situated along the same diameter at each side of the center respectively, displaceable in the opposite direction each consecutive revolution.

During each half-revolution the flap 30 directs the flow to the lagging drop point with respect to the direction of rotation and stops the flow on the other, or leading, drop point. In this way a 180° part-torus is covered in the same direction without interruption. In this case, the half of the torus which is not fed will be used for retrieval, if it is not already filled up. With a single mass, it is therefore possible to alternately assure the heaping of the material to be processed (heap formation) and the retrieval of the heaped material.

For the formation of the strips, the operation is as described above concerning strips of constant or variable section.

In the described embodiments a revolving beam is used to support the displaceable conveyor; it is evident that other material drop devices may be employed, for example, a tipper trolley, a revolving spout, a revolving retractable spout.

Figure 10:
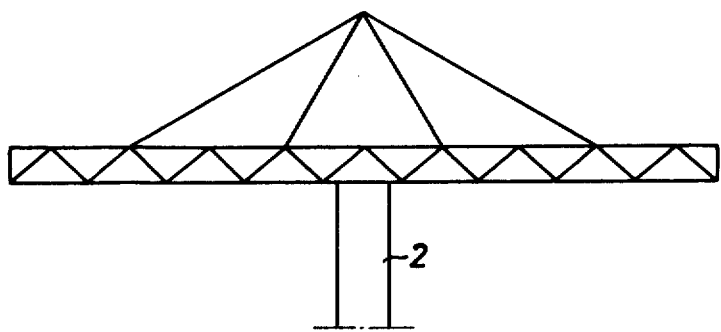

The revolving arm may be supported at the periphery of the torus and on a central shaft or pivot 2 (FIG. 9) or solely by the central shaft or pivot 2 which it then overhangs (FIG. 10).

Figure 11:
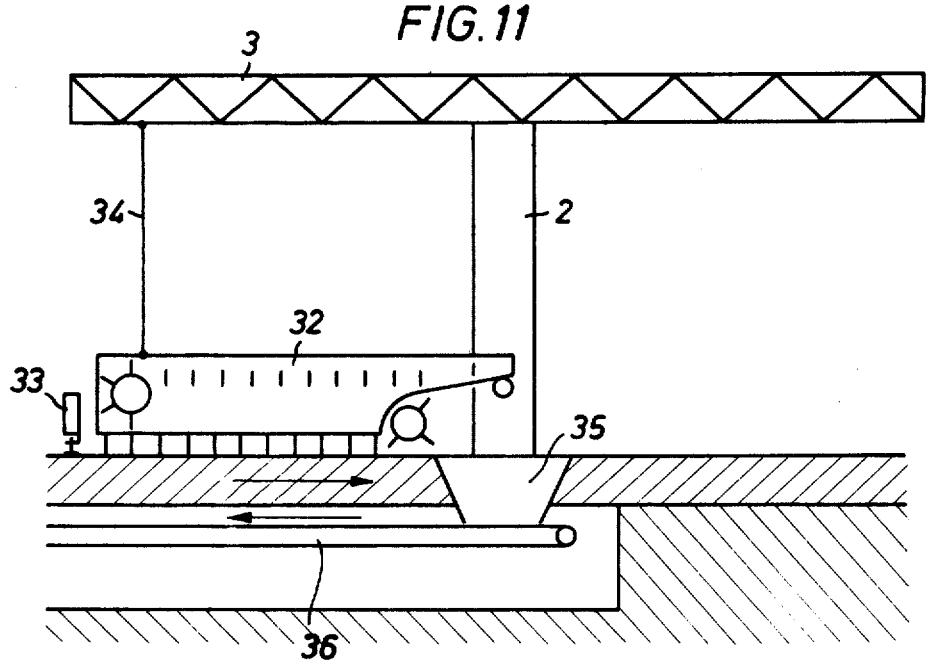

For the retrieval of the material of the strips or toroidal masses, an apparatus, such as shown in FIG. 11, may be utilized. At its lower end close to the area 1, the apparatus 5 of FIG. 1 comprises a scraper device 32 (with a worm or bladed path) supported by a roller 33 at its outer end and radially mounted for rotation about the shaft 2; the retrieval or carrying away of material is then carried out from the periphery towards the center simultaneously across the entire width of the heap along successive planes having the slope of the heap of material, therefore at a constant angle. A device for scraping the heap may be associated with the retrieval means. Exclusively during retrieval, the scraper device 32 may also be suspended by suitable means 34 from the revolving support for the conveyor 3, the material carried away is emptied into a central hopper 35 and conveyed by another endless conveyor belt 36.

The material retrieval may also be effected by an apparatus retrieving a point and displaceable along a radius turning about the axis of the torus, such as a bladed wheel, an excavator with buckets or a scraper pole.

The range of radial displacement of the above retrieval apparatus is at the bottom of the heap or above the heap; this range of radial displacement may, for example, be defined by the beam supporting drop point.

FIG. 12 which includes FIG. $12_1$, an elevation view in section, and FIG. $12_2$, a top plane view, shows a flat area 1 delimited by the wall 35, the top surface of the wall forming a track as will be seen hereinbelow. the vertical shaft 2 is surrounded by a chute 36, the material being processed is introduced at the top end of the chute by the conveyor 37. A motor 38 mounted on the shaft 2 drives the conveyor 3 for radial and rotational displacement, the material from the chute 36 falling continuously or non-continuously on the conveyor 3. The drop ends 39 and 40 of the conveyor 3 are situated to each side of the shaft, the radial displacement of the conveyor causes the material to fall from the drop end 39 at different distances from the shaft 2 along the area 1; a series of strips or toroidal masses 41 are thus formed. In the drawing, the path of the radial movement of the conveyor is such that the material eventually forms a continuous heap 42 of constant thickness over the area 1.

In the vicinity of area 1, a radial motion device 43 provided with scraper spikes 44 is mounted for rotation about the shaft 2; said radial motion device 43 is movable radially and rotationally in the mass of the heap 42. The inner end of the device 43 is supported by an undercarriage 45 with tires which rolls along the top surface of the wall 35 driven by a motor 46 provided for this purpose.

The material so retrieved from the heap 42 is carried in the direction of the arrow F to the discharge hopper 47 arranged around the shaft 2. The angular velocity and forward speed of the motors for the conveyor 3 and the device 43 are mutually controlled so that, as indicated above, a series of strips or toroidal masses with individual superposed layers is formed on the surface; these layers are successively carried to the discharge hopper 47, as homogenized material. The control is effected as a function of the product being processed, in such a manner that the retrieval of material in the toroidal masses or strips corresponds to the desired pre-homogenization or homogenization.

Figure 13:
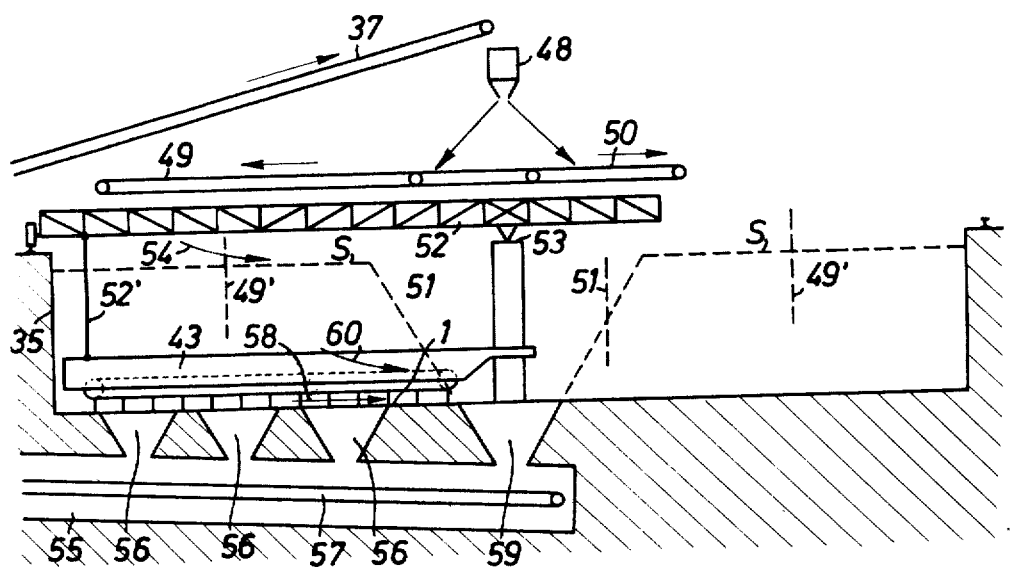

In FIG. 13 an alternative embodiment of the apparatus is illustrated; in this case the volume of revolution is a trapezoid known as a trapezium in the U.K. placed in pit feed by two material drops 180° apart. The discharge is effected by an apparatus placed on the bottom of the pit comprising the area 1 with its wall 35.

The material is delivered by the conveyor 37, it passes through the divider 48 for feeding the two conveyors 49 and 50 mounted on trolleys driven in the same direction. The belts of the conveyors are displaced in opposite directions so that the material drops are 180° apart. The total flow is divided by three in the radial ratios of the drop ends. The drop end of the conveyor 49 is displaced between the outer wall of the pit and its circular center line 49' while the drop point of the conveyor 50 is displaced between the circular center line 49' and the inner periphery 51 of the mass of revolution. Each conveyor 49 and 50 forms an independent 180° angularly displaced heap.

The conveyors 49 and 50 are supported by a revolving arm resting on a central pivot 53 and along the periphery of the pit 35. The rotation of the revolving arm is in the direction indicated by the arrow 54. In this case, in order to obtain strips of constant section the revolving arm 52 turns at a uniform angular velocity.

To obtain the same result with a single conveyor, the revolving arm must have a progressive, variable velocity when the drop point is being displaced from the periphery towards the center, whereas the divider is not necessary then.

The translatory movement of the trolley for the conveyors 49 and 50 is independent of the position of the arm 52. This translatory movement necessitates a reciprocating movement which may or may not be uniform or a stepwise movement with time stoppages at the ends.

The excavator is either fully covered over with the material during the heaping of material or operating without revolving about the pivot 53 in which case it removes the material along the slope of the heap, or it is stopped in the retrieval trench 55 and the material is evacuated by gravity through the spouts 56 to retrieval conveyor 57.

The excavator 43 is supported at one end by the post supporting the pivot 53. It carries the material in the direction of the arrow 58 towards the center of the pit where the material is discharged through the hopper 59 to the conveyor 57.

For retrieval, the excavator or dredger 43 has to sweep the entire pit by rotating in the direction of the arrow 60.

At its other end the excavator 43 slides along the bottom of the pit with a suitable driving mechanism where it is supported by an arm bearing on the wall 35 of the pit. It may be suspended during this period from the revolving arm 52 by the suspending rod 52′ associated with a jack. In this case, during the carrying away of material, the arm 52 is driven very slowly for merely a single revolution, the suspending rod 52′ being detatched from the arm 52 at the end of this revolution.

The bottom surface 1 of the pit and the top surface of the annular heap may be not horizontal the strips are then not of constant section, or they are formed after several passes.

Figure 14:
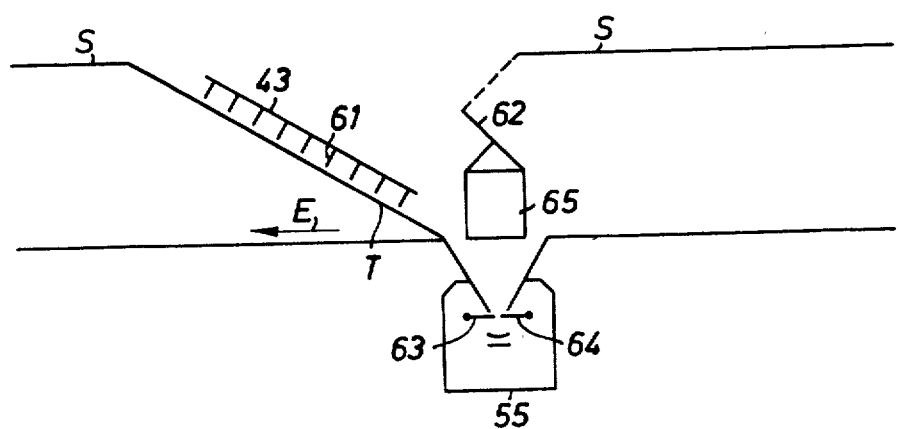

FIG. 14 is a schematic sectional view showing the excavator 43 in place along the retrieval trench 55. The surface S of the heap with a retrieval slope is shown.

A scraping device 61 is used to control the slide of material along the slope of the heap during the advance of the excavator along the direction of the arrow E. It is supported by the scraping device 61 or by the revolving beam 58.

A shield 62 is placed at the top of the excavator 43 for defining the end of the heap.

Two gates or traps 63 and 64 are provided for forming the ends of the heap.

When a pulverulent material being processed with a very low natural heap slope, the heap slope could be consolidated by arranging the excavator 43 beneath the heap and filling in the central part 65 of the pit by stopping the conveyor 57.

At the end of the heaping operation, the trench for the extractor and the conical central part 65 are emptied and recycled before starting the removal of material.

In an operational set-up, wherein the radius R is 25 $m$ and the height $h$ is 3 $m$, a complete revolution of the excavator 43 takes 24 hours, a revolution of the conveyor 3 takes a few minutes. In such a capacity of 2500 tons of material may be provided in continuous treatment. It should be noted that working by batches, alternating retrieval and heaping, a figure of 5000 tons capacity can be obtained.

In continuous operation with angular and radial velocity control defined through simple calculations, the number of strips stepped is in the vicinity of 450 for a feed of 250 MT/h and a tangential velocity at the discharge or drop point of 1 m/s. The method and apparatus avoid segregation the 450 strips have an excellent homogenization power which can even be improved if the feed were divided in two parts; with two conveyors arranged parallel to each other for symmetrical displacement thereby doubling the number of strips. This arrangement provides, moreover, an additional advantage from the point of view of dynamic balancing of the rotating assembly.

The method may be used for the following operations:

1. in-line buffer stockpiling or branch stockpiling
2. homogenization
3. mixture control 1. In-line buffer stockpiling This operation enables a conventional pre-homogenization of a pulverulent material to be carried out. The dimensional requirement is 2,000 m² for 2,500 metric tons, i.e. 1.25 MT/m² for continuous operation or 2.5 MT/m² for batch operation, whereas the conventional method provides 2.5 MT/m² in two heaps where only one is available at any given moment for about the same surface requirement.

It will be noted that the depth of the pit, 3 m in the present example, is provided to limit the forces exerted on the submerged scraping chain. It is possible to go beyond this depth by providing air injection at starting the chain.

2. Homogenization

The homogenization power for continuous operation, as already indicated, is given as a function of the homogeneity of the retrieved product relative to the contents of the stockpile at any given moment.

The stockpile being in line throughout the process, it is necessary to consider the contents relative to the circulating flow rate.

With a 2,500 MT capacity for a flow rate of 250 MT/hr, over 10 hours, the mean composition of the flow can be maintained at its setting.

The problem is the same as in known continuous, overflow homogenization with the difference that as the mixture is practically perfect, the homogenization power may be calculated.

In the case of a heaping stoppage without a retrieval stoppage, the homogeneity is progressively lost since instead of removing a mean composition of what has been stockpiled over the preceding 10 hours, say, it will be only over the preceding 9 or 8 hours, for example; in any event, a stoppage of 1 or 2 hours should not have any great consequence.

In case the material is used in batches, the problem is simplified: it is only necessary to await the correct mean mixture at the end of the heaping operation 3. Mixture control (dosing)

Here it is necessary to weight the incoming material and to sample it in order to be able to periodically determine the average contents and make whatever corrections as necessary to the incoming material as a function of the deviation ascertained: automation is therefore not necessary since the stockpile is in line and the calculated composition is a variable mean value.

When operating in successive batches, two sets of apparatus, operating alternately for heaping and retrieval are necessary. For the same size pit the capacity could therefore be doubled, the surface of the stockpile being horizontal. In this case the scraping chain for retrieval is covered over by the material; a fluidizing blast may be advantageously utilized for starting.

The successive batch operation obviously gives a greater flexibility since it eliminates taking samples, analyses and corrections during real time.

FIG. 15$_1$ shows an intermediary belt stockpiling apparatus wherein the heap is formed of two 180° strips. A central post 71 is again provided which is used to support a roof 72, two beams 73 are driven about the post by a motor turning at a uniform speed, for example one revolution each 90 seconds. Each beam 73 carries a mobile conveyor belt 74-75 radially displaceable at a given constant, or variable controlled, speed. A spout 76 arranged coaxially with the post 71 rotates with the beams 73 and receives the material coming from the feed conveyor 77 directly or via a temporary storage belt 78 after being stored thereon during a portion of the period and later returning it to the spout 76. For this purpose, the belt 78 is driven (in the present example) by a movement to the left for storage, then to the right for returning the material. The material drops from the spout 76 via conduits 79 to the conveyors 74,75 from which it falls against forming strips 80 of stock piled material.

The retrieval is carried out by a beam displaceable radially relative to the pit, pivoted about the central shaft or pivot 71 and supported at its outer end by a motorized trolly rolling along the top of the wall of the pit. The tangential velocity is, for example, of the order of millimeters per second. This beam supports as described above, a conventional scraping chain with blades returning the material to the central post and a hopper 81 where it is discharged onto the conveyor 82, two scraper knives 83 mounted for horizontal displacement along the beam 84, whereby the cutting angle of the knives is adjustable as a function of the angle of the slope of the heap. Each of the knives travels across half the length of the beam and controls the flow of the material retrieved.

A skirt fixed to the beam is driven in rotation by the beam pivoting about the central post. The purpose of the skirt is to stop a possible avalanche of material towards the pivot or shaft and the chute closing off the unit which could become inundated with dust.

Under these circumstances, the chute 76 rotates with the rotating assembly at a constant velocity. The two conveyors with symmetrical belts are displaced symmetrically along the same line or diameter passing through the center of the pit by means of a trolley rolling along the beam 73, the material coming from the chute is alternately directed to each of the conveyors and falls from the drop points thereof of the circular stockpiling area where it forms strips.

The radial displacement of the conveyors enables the strips to be located at variable radial distances covering the whole stockpiling area.

The alternate feeding of the conveyors through the chute 76 is switched each half-revolution of the rotating assembly.

Consequently, each conveyor alternately drops a 180° strip in position on the bottom of the pit while the other drops nothing.

At the end of the heaping operation, the retrieval operation could be begun very shortly after the heaping operation of the other half of the stockpile.

One must therefore await the end of the retrieval of the material on the first half of the surface in order to fill or heap it once again.

By suitable means, the beginning and end of the half-strips are set off relative to each other progressively not the heaping operation so that the planes of the ends of the half-strips have a slope slightly less than that of the slope of the heap at one end.

At the opposite end of the half-strip 180° displaced therefrom, the slope will be in the opposite direction but it will bear against the end of the preceding half-strip having the same slope.

There is no preceding half-strip when the filling operation begins again.

The oppositely sloped end will slide; the retrieval operation will be started at this end.

The section of the strips varying in inverse proportion to the distance from the center (radius) of the drop point at a constant velocity of the rotating assembly, there is a choice between several solutions for distributing the material according to the section of the heap:

1. vary the velocity of the rotating assembly in inverse proportion to the radius;
2. vary the radial velocity of the conveyors in the same way in order to have more "turns" at the periphery; or
3. vary the path of movement of the conveyors by successive steps or levels while preserving the constant angular velocity of the rotating assembly and the constant radial velocity of the conveyors.

These three alternatives apply the fundamental principle of the invention which consists of depositing the strips continuously without interrupting distributing movement, contrary to what happens in all known systems in which the reciprocating movement requires stoppages. These alternatives respect the integrity of the strips since they are deposited on a horizontal surface or a surface whose slope is sufficiently small to avoid any segregation.

Under these circumstances as in the case of taking samples, each section of the strip situated between two radial planes is a true sample of the entire strip; likewise a section of the heap defined in the same manner is a true sample of the heap.

The choice may thus be made according to technological convenience, the last-mentioned alternative being, however, the simplest and most reliable (owing to the absence of variable speed motors). Generally speaking, it is possible to adjust the radial path of movement of the conveyors as a function of the number of strips which is the number of revolutions of the rotating assembly (or half-strips per half-revolution which amounts to the same thing) or even as a function of the cumulative weight furnished by weighing the incoming materials.

It should be noted that the divergent and convergent spirals deposited during centrifugal and centripetal paths of movement respectively will cross one another. it is preferable that these crossings do not always occur along the same radius or the outer ends of the paths of movement of the conveyor are displaced relative to one another. This result will be attained, in principle, if the round trip time of the radial conveyors is an exact multiple of the time per revolution of the rotating assembly.

In order to completely eliminate lack of uniformity of the mixtures, the stockpile CED (FIG. 15$_2$) is left dead, while successively constituting 180° half-strips; the 180° stockpile is reduced to 144° (with a retrieval slope of 135°), i.e. 25% less, the storage conveyor belt 78 is in place for shooting the strip over the range from 144° to 180°, the apparatus is oriented so that the retrieval may be effected in both directions. Even through the apparatus is slightly more expensive and the storage is reduced by 25%, there is no lack of uniformity of the mixture.

FIG. 16 shows an operational flow sheet.

In this example of equipment for entire cement factory, a stockpile of material A and B, the second being a corrective limestone, is stored in bins $a$, $b$, $c$, $d$, the material B is added to the material A before or after it is passed through a selective crusher $e$; at the outlet thereof it is weighed at $f$, then passed through a sampler $g$ as a function thereof, the additions from the various bins $h$ associated with the weighing operation $i$ are effected, if necessary, as well as fine corrections. The mixture is then conveyed to a device $j$ such as described hereinbefore. The homogenized material is then conveyed to a grinder $k$, then after passing through a separator $l$ separating the portions to be sent back to the grinder $k$, the material is stockpiled in the bins $m$ for supplying the ovens. In FIG. 16 a device $j'$ is provided at the stage of the devices $j$ and $i$ which, when not operating continuously, may be used for processing a mixture pit during the retrieval operation from the device $j$. FIG. 16 also shows a device $n$ in dash-dotted lines at the stage of the grinder $k$ which may be mounted on the circulating load of the grinder $k$ which further improves the efficiency of the plant.

The present device may be used wherever the homogenization of a relatively random composition or a mixture of several fragmentary or pulverulent materials is desired. Its use is particularly advantageous in the iron and steel, glass-making, cement-making, fertilizer or chemical industries where the quantity of material to be homogenized reaches several thousand metric tons. Nevertheless, applications of the present method and apparatus in the pharmaceutical industry or automatic sampling, for example, exist for homogenizing pigments for pharmaceutical products or reducing an average sample of an automatic sampling installation.

The apparatus and method according to the invention may of course be automated on the basis of a program for distributing the strips between the center and the periphery with a choice of strip section.

We claim:

1. A process for blending particulate materials which comprises:
   a. setting the particulate materials with a uniform continuous rotational movement over 36° about an axis in one direction,
   b. simultaneously setting said materials with a radial movement relative to the axis,
   c. heaping the materials by dropping them on a surface in at least one strip and in superposed layers, thus forming at least one toroidal mass about the axis, all radial sections of the mass by planes including the axis of rotation having a constant surface,
   d. cutting radial slices in the toroidal mass, and
   e. retrieving successive radial slices.

2. A method according to claim 1 which comprises:
   a. maintaining the rotational movement at a relatively high velocity,
   b. maintaining the radial movement in a path of adjustable length,
   c. heaping the materials at least at the end of the path, thus forming juxtaposed strips of superposed layers,
   d. cutting sector-shaped slices between pairs of planes which include the axis of rotation, and
   e. retrieving the various slices in the course of a rotational movement.

3. A method according to claim 2 which comprises maintaining the velocity of rotational movement for dropping the materials on the surface substantially greater than the velocity of rotational movement for retrieving the materials.

4. A method according to claim 1 wherein the layers are of equal thickness along a given radius of the toroidal mass.

5. A method according to claim 1 wherein the maximum thickness of the layers is dependent upon the rotational velocity as a function of the materials being processed.

6. A method according to claim 1 wherein the surface is conical, with a slope sufficiently small to avoid any segregation.

7. A method according to claim 1 wherein the surface is flat.

8. A method according to claim 1 which comprises controlling the rotational and radial movements during heaping to obtain a desired distribution of strips.

9. A method according to claim 1 wherein retrieving successive radial slices comprises cutting radial slices of constant inclination into the superposed layers of the materials along successive radii, the inclination of the radial slices being less than the natural slope defined by the toroidal mass.

10. A method according to claim 1 which comprises forming a single strip by setting the materials into motion at constant radial and tangential velocities.

11. A method according to claim 1 for forming two strips of constant radial section and which further comprises dividing the materials into two parts prior to heaping and dropping the respective parts at two drop points symmetrical to each other about the axis of rotation at constant tangential velocity and constant radial velocities, the radial velocities of the drop points being in opposite directions.

12. A method according to claim 11 for forming a toroidal mass which varies in height, the method comprising employing initial velocities in proportion to the height for radial and rotational movements to drop a number of superposed strips on the surface.

13. A method according to claim 1 comprising forming two strips of constant radial section by:
   a. dividing the materials into two streams,
   b. dropping each of the streams at a different drop point,
   c. maintaining the two streams inversely proportional to the distances of the corresponding drop points from the axis of rotation,
   d. maintaining the distance between the drop points constant and equal to the mean diameter of the toroidal mass,
   e. maintaining the angular velocity of the drop points constant, and
   f. maintaining a radial velocity of the drop points which is constant and in the same direction.

14. A method according to claim 1 for forming a toroidal mass which varies in height and which comprises maintaining velocities of radial and rotational movement so as to superimpose strips in equal proportion over the radial dimension of the section.

15. A method according to claim 14 for forming a plurality of angularly offset part-toroidal masses and which comprises storing a portion of the materials in reserve for a time necessary to interrupt dropping materials along at least a portion of the distance between two part-toroidal masses, freeing stored materials, and radially displacing the heaping for dropping the stored materials.

16. A process for blending particulate materials which comprises:
   a. dividing the materials into two parts,
   b. setting each part of the particulate materials with a uniform continuous rotational movement about an axis in one direction,
   c. simultaneously setting each part of said materials with a radial movement relative to the axis,
   d. heaping the respective parts of the materials by dropping them on a surface at two drop points in strips and in superposed layers, thus forming at least one mass about the axis; all radial sections of any such mass by planes including the axis of rotation having a constant surface, the two drop points being symmetrical to each other about the axis of rotation, rotation being at constant tangential velocity and at constant radial velocities, and the radial velocities of the drop points being in opposite directions,
   e. maintaining the drop points radially displaceable along a diametral line symmetrically relative to the axis of rotation,
   f. feeding the materials during each half revolution of the drop points at the trailing drop point relative to the direction of rotation,
   g. cutting radial slices in the mass, and
   h. retrieving successive radial slices.

17. A process for blending particulate materials which comprises:
   a. dividing the materials into two streams,
   b. setting each stream of the particulate materials with a uniform continuous rotational movement about an axis in one direction,
   c. simultaneously setting each stream of said materials with a radial movement relative to the axis,
   d. heaping the materials by dropping each of the streams at a different drop point on a surface in at least one strip and in superposed layers, thus forming at least one mass about the axis, all radial sections of any such mass by planes including the axis of rotation having a constant surface,
   e. maintaining the two streams inversely proportional to the distance of the corresponding drop points from the axis of rotation,
   f. maintaining the distance between the drop points constant and equal to the mean diameter of the mass,
   g. maintaining the angular velocity of the drop points constant,
   h. maintaining a radial velocity of the drop points which is constant and in the same direction,
   i. cutting radial slices in the mass, and
   j. retreiving successive radial slices.

18. A method according to claim 17 which comprises radially displacing each drop point over half the radial dimension of the toroidal mass being formed as two concentric part-toroidal masses, each part-toroidal mass being 180° angularly offset from the other.

19. A method according to claim 17 which comprises radially displacing each drop point over half of the toroidal mass being formed as two concentric part-toroidal masses, each part-toroidal mass extending over a separate 180° sector of the surface.

* * * * *

UNITED STATES PATENT OFFICE
CERTIFICATE OF CORRECTION

Patent No. __3,913,761__   Dated __October 21, 1975__

Inventor(s) __RAYMOND LOUIS PRONER AND RENÉ LÉON CLÉMENT BOURGOIN__

It is certified that error appears in the above-identified patent and that said Letters Patent are hereby corrected as shown below:

Column 1, line 43, "With a certain" should read --With certain--; line 44, "mechanisms, the" should read --mechanisms,--. Column 9, line 62, "hereinbelow. the" should read --hereinbelow. The--. Column 13, line 30, "a conventional" should read -- - a conventional--; line 33, "two" should read -- - two---. Column 14, line 56, "it is" should read --It is--. Column 15, line 51, "36°" should read --360°--.

Signed and Sealed this twenty-fourth Day of February 1976

[SEAL]

Attest:

RUTH C. MASON  
*Attesting Officer*

C. MARSHALL DANN  
*Commissioner of Patents and Trademarks*